United States Patent
Wuhrer et al.

[15] 3,652,207
[45] Mar. 28, 1972

[54] PROCESS FOR THE PRODUCTION OF SYNTHETIC DIOPSIDE

[72] Inventors: Josef Wuhrer, Wulfrath; Heinz-Georg Kurczyk, Monchengladbach; Adrian Ottenheym, Wulfrath, all of Germany

[73] Assignee: Rheinische Kalksteinwerke GmbH, Wulfrath, Germany

[22] Filed: Apr. 10, 1970

[21] Appl. No.: 27,434

[30] Foreign Application Priority Data

Apr. 11, 1969 Germany .......................P 19 18 459.9

[52] U.S. Cl. ..............................23/110 R, 23/182, 106/120
[51] Int. Cl. .....................................C01b 33/22, C01b 33/24
[58] Field of Search ......................23/110, 182, 201; 106/120

[56] References Cited

UNITED STATES PATENTS

| | | | |
|---|---|---|---|
| 3,264,130 | 8/1966 | Mays | 23/110 R X |
| 2,590,566 | 3/1952 | Osborn | 23/110 R |
| 3,257,220 | 6/1966 | Kalousek et al. | 23/110 R X |
| 2,665,996 | 1/1954 | Kalousek | 106/120 |
| 3,033,648 | 5/1962 | Vander Linden | 23/110 R |
| 2,343,151 | 2/1944 | MacIntire | 23/201 |

*Primary Examiner*—Edward Stern
*Attorney*—Christen & Sabol

[57] ABSTRACT

A process for the production of synthetic diopside wherein dolomite and silicic acid are hydrothermally converted into calcium and magnesium hydrosilicates which are in turn converted by dehydration into diopside. In the hydrothermal conversion from 10 to 40 percent by weight of water is added to the dolomite and silicic acid in a closed reaction vessel, and the reaction mixture is preferably simultaneously mixed and comminuted. The resulting calcium and magnesium hydrosilicates are preferably heated to a temperature of 1,200° to 1,250° C. and are converted into diopside.

5 Claims, No Drawings

PROCESS FOR THE PRODUCTION OF SYNTHETIC DIOPSIDE

The present invention relates to a process for the production of synthetic diopside $CaMgSi_2O_6$ from dolomite and silicic acid.

Diopside is the silicate of calcium and magnesium and is a valuable raw material for the ceramic industry. Naturally occurring diopside is a monoclinic pyroxene and ideally consists of the silicate of calcium and magnesium $CaMgSi_2O_6$. Commonly, however, the diopside contains a variable content of $FeSi_2O_6$ in addition thereto and is thus not desirable for ceramic purposes. Moreover, diopside is not found in large quantities in nature, occurring usually in small quantities in company with wollastonite ($CaOSiO_2$). Diopside, however, is a valuable ceramic raw material since it is particularly suitable for use in formation of electric insulators because it makes possible low firing temperatures. The heat resistance of diopside is higher when compared for example to the customarily used enstatite (a magnesium silicate).

Heretofore in the ceramics industry it has been known to use a mixture of wollastonite as a calcium silicate source, and a basic substance similar to enstatite as a magnesium silicate source, to approximate the naturally occurring diopside. The enstatite-like substance is conventionally obtained by firing of steatite, a coarse, massive or granular variety of talc and thus an acid metasilicate of magnesium. Steatite has the approximate composition $3MgO \cdot 4SiO_2 \cdot H_2O$ to $4MgO \cdot 5SiO_2 \cdot H_2O$ and in addition contains from 5 to 15 percent by weight impurities. During heating of the steatite to higher temperatures in the firing process, the magnesium metasilicates enstatite or clinoenstatite ($MgO \cdot SiO_2$) and cristobalite (crystalline silica) are formed. The presence of cristobalite in the product, however, is highly undesirable since it decreases heat resistance of products made therefrom. There has therefore remained the task of developing an economic process for the production of synthetic diopside.

It is therefore an object of the present invention to provide a novel process for the production of calcium and magnesium hydrosilicates, and especially of Xonotlite and Cerolite.

It is a further object of the present invention to provide a process for the production of synthetic diopside.

It is another object of the present invention to provide such processes which are economical and which overcome the disadvantages of prior art processes.

It is still another object of the present invention to provide a synthetic diopside which is highly advantageous over prior art approximations of the naturally occurring mineral in the ceramics industry.

Other objects and advantages of the present invention will become apparent from a consideration of the following specification and claims. For a more comprehensive disclosure of the nature, objects and advantages of the invention, reference is made to the following detailed description of the process of the present invention for the production of calcium and magnesium hydrosilicates and for the subsequent preferred production of synthetic diopside.

In copending application Ser. No. 859,407 filed Sept. 19, 1969, it is disclosed that synthetic wollastonite $CaOSiO_2$ is obtained from lime and silicic acid. In that process, the lime and the silicic acid are first converted in approximately equivalent quantities and in presence of water to calcium hydrosilicates, which subsequently are dehydrated into wollastonite. According to a preferred form of the process, the hydrothermal conversion to calcium hydrosilicates is carried out at temperatures of from 170° to 200° C., and it is advantageous to carry out this conversion with simultaneous crushing or grinding of the reaction mixture.

It has now been found that calcium and magnesium hydrosilicates, especially Xonotlite and Cerolite, can be produced through the hydrothermal conversion of dolomite and silicic acid in approximately equivalent quantities at elevated temperatures and under pressure, when the starting substances of dolomite and silicic acid are mixed gradually with 10–40 percent by weight of water, based on the weight of the starting substances, in a closed vessel, whereby temperatures above 170° C. and preferably above 200° C, occur as a result of the hydration heat of the CaO component of the dolomite. Preferably the closed vessel is a grinding machine and as the hydrothermal conversion proceeds, the starting substances and also the reaction products are simultaneously comminuted in the grinding machine. Surprisingly, as a result of this process, almost complete conversions into calcium and magnesium hydrosilicates occur within very short reaction times. Depending on the quantity of water used, an almost dry to briquettably moist mass can be obtained as an end-product.

Following the initial formation of the calcium hydrosilicates, a catalytically controlled avalanche-like process is released. During this reaction, it is assumed that initially phases similar to tobermorite ($Ca_5[Si_6O_{16}(OH)_2]$ $[Ca(OH)_2]_n \cdot 4H_2O$) will develop, which convert into Xonotlite (calcium hydrosilicate) while releasing water, which again participates in the formation of tobermorite phases. In this manner, the small quantities of water according to the present invention are sufficient and this fact has the advantage that formation of the calcium hydrosilicate, which is an exothermic reaction, makes an outside energy supply unnecessary for maintenance of the reaction temperature because of the steam pressure developed thereby. However, it is important that for continued formation of the hydrosilicates there be present both free water and a steam saturated atmosphere in the reaction vessel. For the initiation of the reaction between the CaO component of the dolomite and silicic acid, a certain quantity of water is necessary. This quantity of water slakes a part of the CaO while forming calcium hydroxide and simultaneously forming steam. As a result, conditions are created for the formation of tobermorite phases, after which a further addition of water continuously increases the process which accelerates autocatalytically. As a consequence, the temperature rises beyond 170° C. and preferably above 200° C. and thus creates the conditions for formation of the end products Xonotlite (calcium hydrosilicate) and Cerolite (magnesium hydrosilicate). The amount of water used therefore, for practical purposes, will be based on the course of the reaction and its pressure and temperature conditions.

The hydrothermal conversion is thus advantageously carried out at temperatures above 170° C. and preferably above 200° C. As starting materials there may be used caustic calcined dolomite and pit quartz sand or other suitable $SiO_2$ carriers, together with the disclosed quantities of water. The calcined dolomite should contain at least 80% CaO and MgO and the mole ratio of CaO to MgO should effectively amount to about 1:1. A slight deviation from this mole ratio, as it frequently occurs in natural dolomite, however is not critical. For practical purposes, the quartz sand should be used in the form of a fine grain, as a result of which the conversion is accelerated.

The hydrothermal conversion reaction can be carried out in the conventional manner used, for example, in the hardening of lime sandstone and can also be carried out in autoclaves customary for this purpose. According to a preferred variation of the process according to the present invention, however, the hydrothermal conversion is carried out with a simultaneous grinding or crushing of the reaction mixture. In this way, a far more rapid reaction takes place to form the hydrosilicates.

The comminution of the reaction mixture through grinding is effectively accomplished according to the principle of autogenic grinding, whereby the grains of quartz and dolomite will comminute each other. At the same time, the hydrosilicates formed on the surfaces of the grains are scoured and new surfaces are opened. According to the process of the present invention therefore, one can use standard commercial quartz and calcined dolomite grains, and it is not necessary to start with expensive powders. After the conversion: $6(CaO \cdot MgO) + 12 SiO_2 + 7H_2O$ $$\xrightarrow{\text{hydrothermal conversion}}$$

$6CaO \cdot 6SiO_2 \cdot H_2O + 6(MgO \cdot SiO_2 \cdot H_2O)$, an intimate mixture of the calcium hydrosilicate Xonotlite and the magnesium hydrosilicate Cerolite is formed.

Referring now more particularly to a detailed description of a preferred mode of the invention for the production and further treatment of calcium and magnesium hydrosilicates, the $SiO_2$ component, for example quartz sand, and calcined dolomite are fed at a desired mixing ratio, e.g. 1:1, into the reaction vessel. The "autoclave mill" preferably used in the present invention is an enclosed vessel which has been modified to be rotatable and thus also function as a grinding apparatus. After the charge, the autoclave mill is closed, put in rotation and 10–20 percent of the required quantity of water is measured and fed in. The temperature of the reaction mixture rises and further water is measured in in accordance with the rise in temperature. The reaction is concluded whenever the required quantity of water has been added and a drop in temperature becomes noticeable. The autoclave mill is emptied into one or several flash containers into which the reaction product is forced by the pressure existing in the mill. Any remaining reaction product is removed from the autoclave mill. After separation of solid substances from the reaction product, the remaining product may be briquetted moist and, corresponding to the subsequent treatment desired, fed into a tunnel kiln or into a chamber furnace and converted to diopside by calcining, e.g. at a temperature between 1,200° and 1,250° C. In the alternative, the reaction product may be introduced as a sludge into a rotary kiln wherein it is calcined into diopside.

The dolomite used herein preferably contains at least 40 percent of the CaO component. It is to be understood that instead of calcined dolomite, one could also convert dolomite hydrate with silicic acid; however, it is preferable to utilize the heat developed during slaking of the CaO component to heat up the dolomite-silicic acid mixture for the hydrothermal conversion reaction, especially when said reaction is accompanied with simultaneous grinding and crushing of the reaction mixture. Therefore, preferably, the dry reactants are first placed into an autoclave mill, preferably already containing some previously ground material, and the required quantity of water is then added gradually while simultaneously grinding the reaction mixture.

The following are specific examples of preferred embodiments of the present invention.

EXAMPLE 1

Substantially equivalent weight amounts of calcined dolomite and quartz sand were charged into an autoclave mill. The autoclave mill was closed and rotated and 15 percent of water, based on the combined weight of dolomite and silicic acid, was fed into the mill. The temperature of the reaction mixture rose to above 200° C. and additional water was added to the mill. As soon as the temperature in the autoclave mill began to drop, addition of water was ceased. The calcium and magnesium hydrosilicate reaction product was transferred to a multicyclone wherein solid substances were removed.

A portion of the hydrosilicates obtained was briquetted. Half of the briquettes were placed in a tunnel kiln and the other half into a chamber furnace wherein the temperature was raised to about 1,200° C. and the hydrosilicate mixture was converted into diopside.

Another portion of the hydrosilicates obtained was transferred into a rotary kiln. The temperature therein was raised to about 1,250° C. and the hydrosilicate mixture was converted into diopside. In both instances, the calcined product had a specific weight of 3.3 g./cc. and a melting point of about 1,390° C.

What is claimed is:

1. A process for the production of synthetic diopside which comprises hydrothermally converting dolomite and silicic acid into synthetic Xonotlite and Cerolite by mixing the dolomite and silicic acid and gradually adding thereto from 10 to 40 percent by weight of water based on the combined weight of the dolomite and silicic acid in a closed reaction vessel until the temperature in said vessel reaches at least 170° C., and thereafter dehydrating said Xonotlite and Cerolite at a temperature of from 1,200° to 1,250° C. to form said diopside.

2. The process according to claim 1 wherein the silicic acid is provided in the form of quartz sand.

3. The process according to claim 1 wherein the hydrothermal conversion is conducted at a temperature of at least 200° C.

4. The process according to claim 1 wherein the hydrothermal conversion is conducted while simultaneously comminuting the reaction mixture.

5. The process according to claim 4 wherein comminution of the reaction mixture is an autogenic comminution.

* * * * *